US008347076B2

(12) United States Patent
Lee et al.

(10) Patent No.: US 8,347,076 B2
(45) Date of Patent: Jan. 1, 2013

(54) SYSTEM AND METHOD FOR BUILDING HOME DOMAIN USING SMART CARD WHICH CONTAINS INFORMATION OF HOME NETWORK MEMBER DEVICE

(75) Inventors: Jae-heung Lee, Suwon-si (KR); Myung-sun Kim, Uiwang-si (KR); Su-hyun Nam, Seoul (KR); Yong-jin Jang, Gwacheon-si (KR); Yang-lim Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1344 days.

(21) Appl. No.: 11/000,244

(22) Filed: Dec. 1, 2004

(65) Prior Publication Data
US 2005/0120216 A1    Jun. 2, 2005

Related U.S. Application Data

(60) Provisional application No. 60/525,701, filed on Dec. 1, 2003.

(30) Foreign Application Priority Data

Feb. 17, 2004 (KR) .................. 10-2004-0010409

(51) Int. Cl.
*H04L 29/06* (2006.01)
*H04L 9/32* (2006.01)
*G06F 15/16* (2006.01)
(52) U.S. Cl. ......... 713/155; 713/172; 709/228; 709/229
(58) Field of Classification Search .......... 713/150–156, 713/159–163, 168–173; 709/227–229; 726/2–7, 726/11–15
See application file for complete search history.

(56) References Cited

U.S. PATENT DOCUMENTS 4,862,501 A  *  8/1989  Kamitake et al. ............. 713/172
5,293,029 A  *  3/1994  Iijima ......................... 235/380
(Continued)

FOREIGN PATENT DOCUMENTS

CN    1375151    10/2002
(Continued)

OTHER PUBLICATIONS

Menezes, Alfred J et al. "Handbook of Applied Cryptography," 1997, CRC Press LLC, p. 580.*
(Continued)

*Primary Examiner* — Darren B Schwartz
(74) *Attorney, Agent, or Firm* — Sughrue Mion, PLLC

(57) ABSTRACT

A home domain building method and system that allow devices to join a home domain using smart cards. In the method, a master device reads device information from a smart card having a device ID and a device key as the device information of a guest device authenticated as a legal device and transmits a challenge request signal to the guest device, the guest device randomly generates a challenge value in response to the challenge request signal, the master device encrypts the challenge value using the device key of the guest device and transmits the encrypted challenge value to the guest device, the guest device decrypts the encrypted challenge value, and if the decrypted challenge value is the same as the challenge value generated in response to the challenge request signal, the guest device allows the master device to join the guest device in the home domain.

28 Claims, 4 Drawing Sheets

U.S. PATENT DOCUMENTS

| | | | | |
|---|---|---|---|---|
| 5,371,794 A * | 12/1994 | Diffie et al. | | 713/156 |
| 5,602,918 A * | 2/1997 | Chen et al. | | 713/153 |
| 5,761,309 A * | 6/1998 | Ohashi et al. | | 713/156 |
| 6,028,937 A * | 2/2000 | Tatebayashi et al. | | 713/169 |
| 6,073,236 A * | 6/2000 | Kusakabe et al. | | 713/169 |
| 6,178,244 B1 * | 1/2001 | Takeda et al. | | 380/277 |
| 6,385,317 B1 * | 5/2002 | Rix et al. | | 380/258 |
| 6,999,948 B1 * | 2/2006 | Hatanaka et al. | | 705/65 |
| 7,280,533 B2 * | 10/2007 | Khartabil et al. | | 370/352 |
| 7,584,280 B2 * | 9/2009 | Kim et al. | | 709/226 |
| 2001/0020254 A1 * | 9/2001 | Blumenau et al. | | 709/229 |
| 2002/0061748 A1 * | 5/2002 | Nakakita et al. | | 455/435 |
| 2002/0087351 A1 | 7/2002 | Jo | | |
| 2002/0115426 A1 * | 8/2002 | Olson et al. | | 455/410 |
| 2002/0157002 A1 * | 10/2002 | Messerges et al. | | 713/155 |
| 2002/0196808 A1 * | 12/2002 | Karri et al. | | 370/468 |
| 2003/0028664 A1 * | 2/2003 | Tan et al. | | 709/237 |
| 2003/0217270 A1 * | 11/2003 | Nakayama | | 713/172 |
| 2004/0053622 A1 * | 3/2004 | Nakakita et al. | | 455/450 |
| 2004/0073797 A1 * | 4/2004 | Fascenda | | 713/171 |
| 2004/0111496 A1 | 6/2004 | Han et al. | | |
| 2004/0158333 A1 | 8/2004 | Ha et al. | | |
| 2004/0250077 A1 | 12/2004 | Jang et al. | | |
| 2005/0005093 A1 * | 1/2005 | Bartels et al. | | 713/150 |
| 2005/0074122 A1 * | 4/2005 | Fascenda | | 380/258 |

FOREIGN PATENT DOCUMENTS

| | | |
|---|---|---|
| JP | 2001-168892 A | 6/2001 |
| JP | 2001-256345 A | 9/2001 |
| JP | 2002-345051 A | 11/2002 |
| KR | 10-0228021 B1 | 8/1999 |
| KR | 2001-0103481 A | 11/2001 |
| KR | 2002-011472 A | 12/2001 |
| KR | 2003-0032014 A | 4/2003 |
| KR | 1020040104778 A | 12/2004 |
| WO | WO 01/22661 A2 | 3/2001 |
| WO | WO0122661 A2 | 3/2001 |
| WO | WO 03/013174 A1 | 2/2003 |

OTHER PUBLICATIONS

U.S. Appl. No. 60/484,383.*
Jun. 6, 2008 First Office Action in corresponding Chinese Application No. 200480035522X with English translation.
Non-Final Rejection issued Oct. 26, 2010, in counterpart Korean Application No. 10-2004-0010409.
Comminication dated Sep. 6, 2011 issued by the Korean Patent Office in counterpart Korean Application No. 10-2004-0010409.
Communication dated May 16, 2012, issued by the State Intellectual Property Office of P.R. China in counterpart Chinese Patent Application No. 200480035522.X.

* cited by examiner

SYSTEM AND METHOD FOR BUILDING HOME DOMAIN USING SMART CARD WHICH CONTAINS INFORMATION OF HOME NETWORK MEMBER DEVICE

BACKGROUND OF THE INVENTION

This application claims the priority of Korean Patent Application No. 2004-10409, filed on Feb. 17, 2004, in the Korean Intellectual Property Office, and U.S. Provisional Application No. 60/525,701 filed on Dec. 1, 2003 in the United States Patent and Trademark Office, the disclosures of which are incorporated herein by reference in their entirety.

1. Field of the Invention

The present invention relates to a method of joining a controlled device to a home network, and more particularly, to a method of joining a controlled device to a home network domain by using a smart card which contains information of the controlled device.

2. Description of the Related Art

In order to prevent the illegal reproduction or distribution of audio and video digital contents, various technologies for copyright protection have been suggested, which allow only specific devices to decrypt digital contents according to a predefined rule. Some of these technologies are digital video disc (DVD) content scrambling, content protection for recordable media (CPRM), digital transmission content protection (DTCP), high definition content protection (HDCP), content protection system architecture (CPSA), and digital rights management (DRM).

Also, technologies for protecting contents in a home network system have been suggested, such as the 'xCP cluster protocol' developed by IBM.

The xCP cluster protocol is a technology based on broadcast encryption and adopts a method of introducing a domain concept called a cluster and allows devices included in the cluster to freely use each other's contents.

FIG. 1 is a block diagram of a conventional home domain with a master-slave structure. FIG. 2 is a flowchart illustrating a process wherein a master device authenticates legality of a device intending to join a home domain. In FIG. 2, a process of building an authenticated home domain 100 with a master-slave structure on the basis of the xCP cluster protocol is described. The process is largely divided into a cluster generation process in step S210 and a device authentication process in step S220.

A first device 110, which is connected to a certain home network at first, generates a binding identification (IDb) of the home network in step S212. The IDb is a unique identifier set when the device is manufactured or set by a user. When the IDb is generated, a cluster identified by the IDb, i.e., a domain, is generated.

Each of devices 120, 130, and 140, which intend to use contents stored in the first device 110, extracts a media key (Km) from a media key block (MKB) using a device key in step S221. Each of the devices 120, 130, and 140 generates a secret key (Kp) using the extracted Km and a personal ID (IDp) in step S223. The devices 120, 130, and 140 request device authentication from the first device 110 in step S225. That is, each of the devices 120, 130, and 140 transmits the IDp, which is a personal unique identifier, 'type', which represents a type of each device, and h=MAC(IDp∥type)Kp, which is a hash value of the IDp and the type, obtained by using the Kp, to the first device 110, wherein MAC indicates a message authentication code.

The first device 110 obtains Kp' using the Km and the IDp, compares a hash value h'=MAC(IDp∥type)Kp' obtained using the Kp' and the hash value h received from each of the devices 120, 130, and 140 and determines whether the hash values h and h' are the same. If the hash values h and h' are the same, the first device 110 transmits E(IDb)Kp, in which the IDb is encrypted using the Kp, and the IDp, which is a unique ID of each of the devices 120, 130, and 140, to the devices 120, 130, and 140 and adds the IDp in an authentication table (auth.tab). Each of devices 120, 130, and 140 extracts the IDb from the E(IDb)Kp received from the first device 110, and then the device authentication is accomplished in step S227.

Accordingly, the authenticated home domain 100, which includes a master device 110 and slave devices 120, 130, and 140, is built. After the authenticated home domain 100 is built, the slave devices 120, 130, and 140 can receive contents from the master device 110 and use them.

According to the xCP cluster protocol described above, all devices in a communication range can automatically join a domain through the authentication process as soon as the devices are physically connected to a master device without selecting the devices to be included in the domain. Therefore, if a user makes a mistake in connecting a device, that must not be in the domain, to the master device, in order to prevent the device from receiving contents from the master device, the user must disconnect the device from the master device. If the user wants to allow the device to legally join the domain, the user must connect the device to the master device again.

Furthermore, according to a conventional authenticated home domain building method, since only a master device can authenticate devices to be newly joined to the home domain and the devices to be newly joined to the home domain cannot authenticate the master device, the user cannot determine whether a device has been registered in the master device of the home domain.

SUMMARY OF THE INVENTION

It is an aspect of the present invention to provide a home domain building method that allows devices to join a home domain more simply and safely using smart cards allocated to every device.

It is an aspect of the present invention to also provide a home domain building method that allows a controlled device authenticated as a legal device by a master device to join an authenticated home domain by letting a smart card reader read a smart card corresponding to the controlled device.

It is an aspect of the present invention to also provide a home domain building method that prevents another external master device from joining devices to a home domain by allowing the devices intending to join the home domain to authenticate a master device of the home domain at will.

Consistent with an aspect of the present invention, there is provided a home domain building system comprising: a guest device, legality of which is authenticated by a master device in a home domain; and a data storage medium, which stores device information of the guest device, wherein the device information, after the legality of the guest device is authenticated by the master device, is read by the master device and used for the master device to join the guest device to the home domain.

Consistent with another aspect of the present invention, there is provided a home domain building system comprising: a guest device, legality of which is authenticated; a data storage medium, which stores device information of the guest device; and a master device in a predetermined home domain, which, after the legality of the guest device is authenticated by the master device, reads the device information of the guest device and joins the guest device in the home domain on the basis of the read device information.

Consistent with another aspect of the present invention, there is provided a home domain building method of joining a guest device in a predetermined home domain in a home network comprising a master device in the home domain and the guest device, legality of which is authenticated by the master device, the method comprising: the master device reading device information from a data storage medium storing the device information of the guest device; and the master device joining the guest device in the home domain on the basis of the read device information.

The master device joining the guest device in the home domain on the basis of the read device information may comprise: transmitting a challenge request signal from the master device to the guest device; generating a challenge value in response to the challenge request signal in the guest device and transmitting the challenge value to the master device; encrypting the challenge value using a predetermined encryption algorithm in the master device and transmitting the encrypted challenge value to the guest device; decrypting the encrypted challenge value using the predetermined encryption algorithm in the guest device; and determining whether the decrypted challenge value is the same as the generated challenge value in the guest device, and if the decrypted challenge value is the same as the generated challenge value, allowing the master device to join the guest device in the home domain.

Consistent with another aspect of the present invention, there is provided a home network member device comprising: a communication unit, which, when device information of the home network member device is read by a master device in a home domain from a storage medium having the device information, exchanges predetermined information with the master device on the basis of the read device information; and a master device authentication unit, which authenticates whether the master device has a right to join the home network member device in the home domain by exchanging the predetermined information.

In an exemplary embodiment, the master device authentication unit generates a challenge value in response to a challenge request signal received from the master device, decrypts the challenge value encrypted in the master device using a predetermined encryption algorithm, determines whether the decrypted challenge value is the same as the generated challenge value, and if the decrypted challenge value is the same as the generated challenge value, allows the master device to join the home network member device in the home domain.

In another exemplary embodiment, the device information comprises a device ID, which is used to distinguish the home network member device and referred to by the master device to determine a guest device to transmit the challenge request signal, and a device key, which is used as an encryption key for encrypting the challenge value.

In another exemplary embodiment, if the predetermined encryption algorithm is a symmetric encryption algorithm, the master device authentication unit has a same decryption key as the device key, and if the predetermined encryption algorithm is an asymmetric encryption algorithm, the master device authentication unit has a secret key making a pair with the device key.

Consistent with another aspect of the present invention, there is provided a master device authentication method that allows a home network member device to authenticate a master device in a home domain, the method comprising: the home network member device, when device information of the home network member device is read by a master device forming a home domain from a storage medium having the device information, exchanging predetermined information with the master device on the basis of the read device information; and the home network member device authenticating whether the master device has a right to join the home network member device in the home domain by exchanging the predetermined information.

Consistent with another aspect of the present invention, there is provided a computer readable medium having recorded thereon a computer readable program for performing the master device authentication method.

Consistent with another aspect of the present invention, there is provided a computer readable medium having recorded thereon a computer readable program for performing a master device authentication method that allows a home network member device to authenticate a master device in a home domain, the method comprising: the home network member device, when device information of the home network member device is read by the master device in the home domain from a storage medium having the device information, receiving a challenge request signal from the master device; the home network member device generating a challenge value in response to the challenge request signal and transmitting the challenge value to the master device; the home network member device receiving the challenge value encrypted using a predetermined encryption algorithm by the master device and decrypting the encrypted challenge value using the predetermined encryption algorithm; the home network member device determining whether the decrypted challenge value is the same as the generated challenge value; and the home network member device, if the decrypted challenge value is the same as the generated challenge value, allowing the master device to join the home network member device in the home domain.

Consistent with another aspect of the present invention, there is provided a first home network member device, which operates as a master device in a home domain in a case where a device mode of the first home network member device is set to master mode and joins a second home network member device in the home domain, comprising: a data reader, which, when the first home network member device operates as a master device, reads device information of the second home network member device from a data storage medium of the second home network member device; and a device join processing unit, which joins the second home network member device in the home domain through exchanging predetermined information with the second home network member device on the basis of the read device information.

In another exemplary embodiment, the device join processing unit joins the second home network member device in the home domain in a case where legality of the first home network member device is authenticated by the second home network member device.

In more detail, it is preferable but not necessary that the device join processing unit joins the second home network member device in the home domain in a case where the device join processing unit transmits a challenge request signal to the second home network member device on the basis of the read device information, receives a challenge value generated in response to the challenge request signal by the second home network member device, encrypts the challenge value using a predetermined encryption algorithm, transmits the encrypted challenge value to the second home network member device, and receives an authentication result that the encrypted challenge value is legal from the second home network member device.

In another exemplary embodiment, the device join processing unit joins the second home network member device in the home domain in a case where it is determined by the second home network member device that a challenge value that is decrypted from the encrypted challenge value using the predetermined encryption algorithm is the same as the generated challenge value.

Consistent with another aspect of the present invention, there is provided a method of allowing a master device in a home domain, which is a first home network member device, to join a second home network member device in the home domain, the method comprising: the master device, reading device information of the second home network member device from a data storage medium of the second home network member device; and the master device joining the second home network member device in the home domain through exchanging predetermined information with the second home network member device on the basis of the read device information.

Consistent with another aspect of the present invention, there is provided a computer readable medium having recorded thereon a computer readable program for performing the method that allows a master device in a home domain to join another home network member device in the home domain.

Consistent with another aspect of the present invention, there is provided a data storage medium, which is used for a master device in a predetermined home domain to join a guest device, legality of which is authenticated, in the predetermined home domain, comprising: a device information storage unit, which stores device information of the guest device, wherein the device information stored in the data storage medium is read by the master device and the read device information is used for joining the guest device in the predetermined home domain.

In another exemplary embodiment, the device information comprises a device ID, which is used to distinguish the guest device, and a device key, which is used as an encryption key for encrypting predetermined information when the guest device is joined to the predetermined home domain.

In another exemplary embodiment, the data storage medium is a smart card.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will now be described more fully with reference to the accompanying drawings, in which exemplary embodiments of the invention are shown. Like reference numbers are used to refer to like elements through on the drawings.

Figure 3:
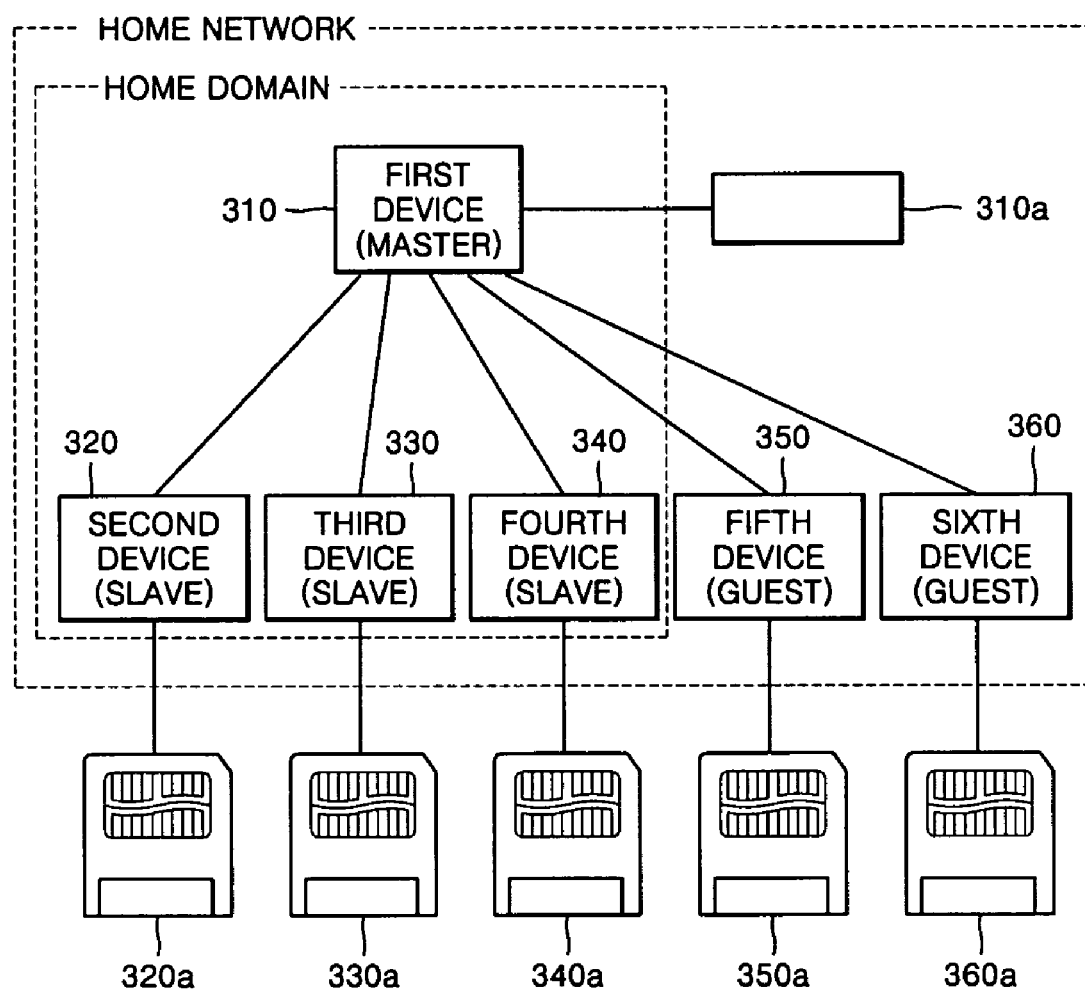
FIG. 3 is a block diagram of a home network consistent with an exemplary embodiment of the present invention.

FIG. 3 is a block diagram of a home network consistent with an exemplary embodiment of the present invention.

One of devices 310 through 360 configuring a home network is set as a master device 310, devices authenticated as legal devices by the master device 310 are set as guest devices 320 through 360, and devices selected by a user of the guest devices are joined as slave devices 320, 330 and 340 in a domain. At this time, the devices selected as the slave devices by the user are registered in a slave device list (not shown) of the master device 310. Meanwhile, the devices 320 through 360 have smart cards 320a through 360a corresponding to the devices 320 through 360, respectively, and the master device 310 has a card reader 310a.

Figure 1:
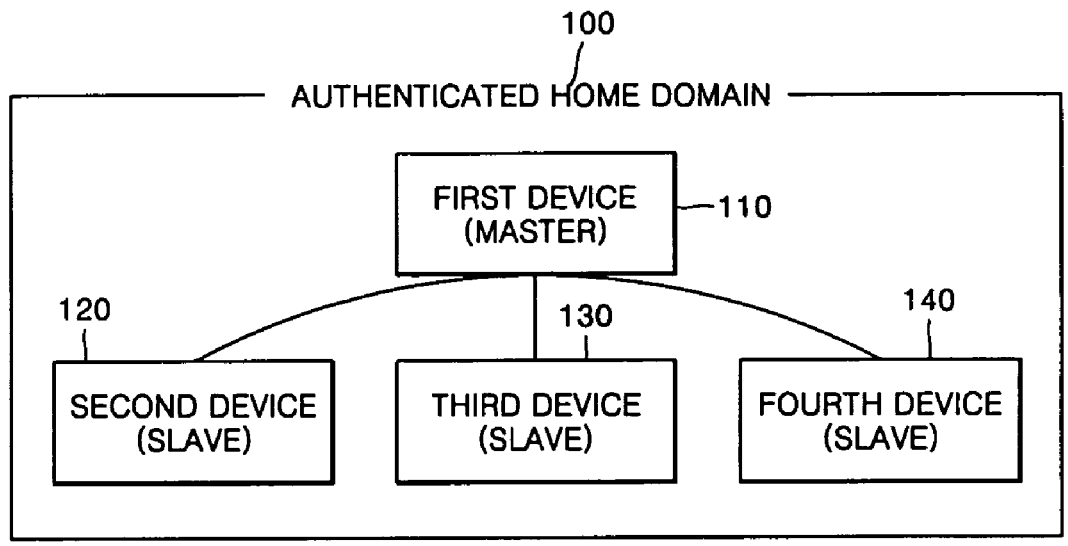
FIG. 1 is a block diagram of a conventional home domain with a master-slave structure.
Figure 2:
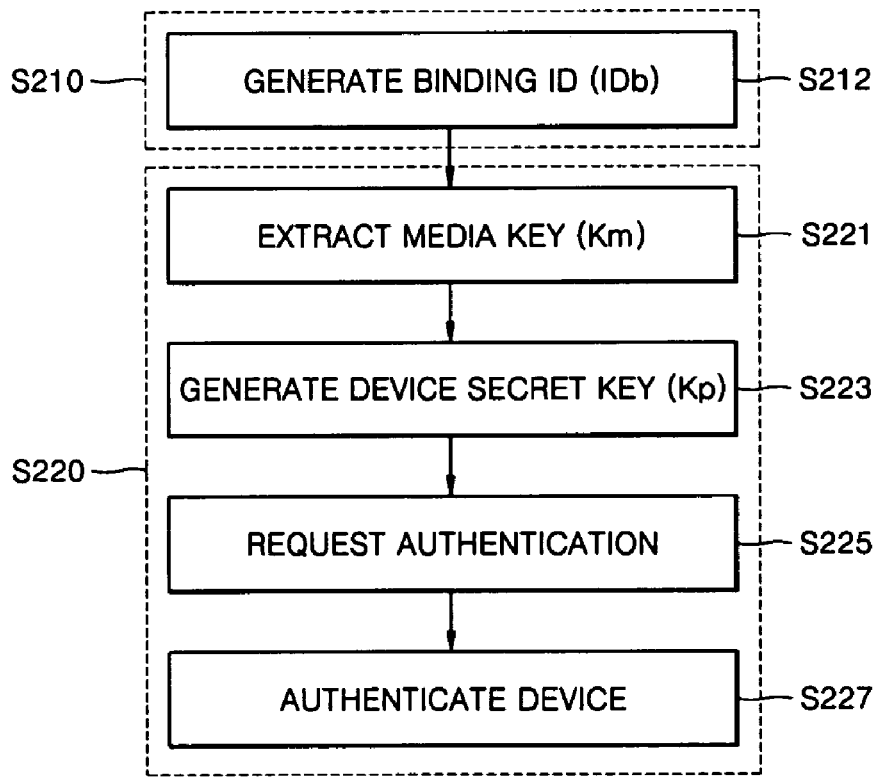
FIG. 2 is a flowchart illustrating a process wherein a master device authenticates legality of a device intending to join a home domain.

That is, all device modes of the devices 310 through 360 in an initial status are set to guest mode, and then if the devices are set as a master device or slave devices, the device modes are changed. Therefore, the devices authenticated as legal devices according to the process of FIG. 2 become guest devices in the home network and cannot use contents stored in the master device 310 unless the device modes are changed to slave mode by user selection.

Each of the smart cards 320a through 360a allocated to devices 320 through 360 stores device information including a serial number of a device, a device ID, which can be used to distinguish a certain device from other devices such as a universal unique identifier (UUID) in a case of universal plug and play (UPnP), and a device key used for data encryption. The device information is used to join a guest device to a home domain by changing the device mode of the guest device to the slave mode.

Each of the devices 320 through 360 has a key corresponding to the device key stored in the smart card, and if a system is built by a symmetric encrypting method in which an encryption key and a decryption key are the same, each of the devices 320 through 360 has a secret key equal to the device key stored in the corresponding smart card, and if a system is built by an asymmetric encrypting method in which an encryption key and a decryption key are different from each other, each of the devices 320 through 360 has a secret key making a pair with the device key, which is a public key, stored in the corresponding smart card.

Meanwhile, in the present exemplary embodiment, the smart card, which is a kind of integrated circuit (IC) chip card, is adopted as an information storage medium, however, a memory card can be simply adopted, and an optical recording medium or a magnetic recording medium can also be adopted instead of the smart card. That is, if information can be written to and read from a medium, any medium can be applied to the present invention without considering a type of the medium. However, considering portability and security, the smart card is used in the exemplary embodiment.

If a card reader can read a proper type smart card, the card reader can be used as the smart card reader 310a whether it is an insert style card or a non-insert style card. For example, if the exemplary present embodiment adopts a Radio Frequency Integrated circuit (RF-IC) type smart card, the smart card reader 310a can be a non-insert style card.

Figure 4:
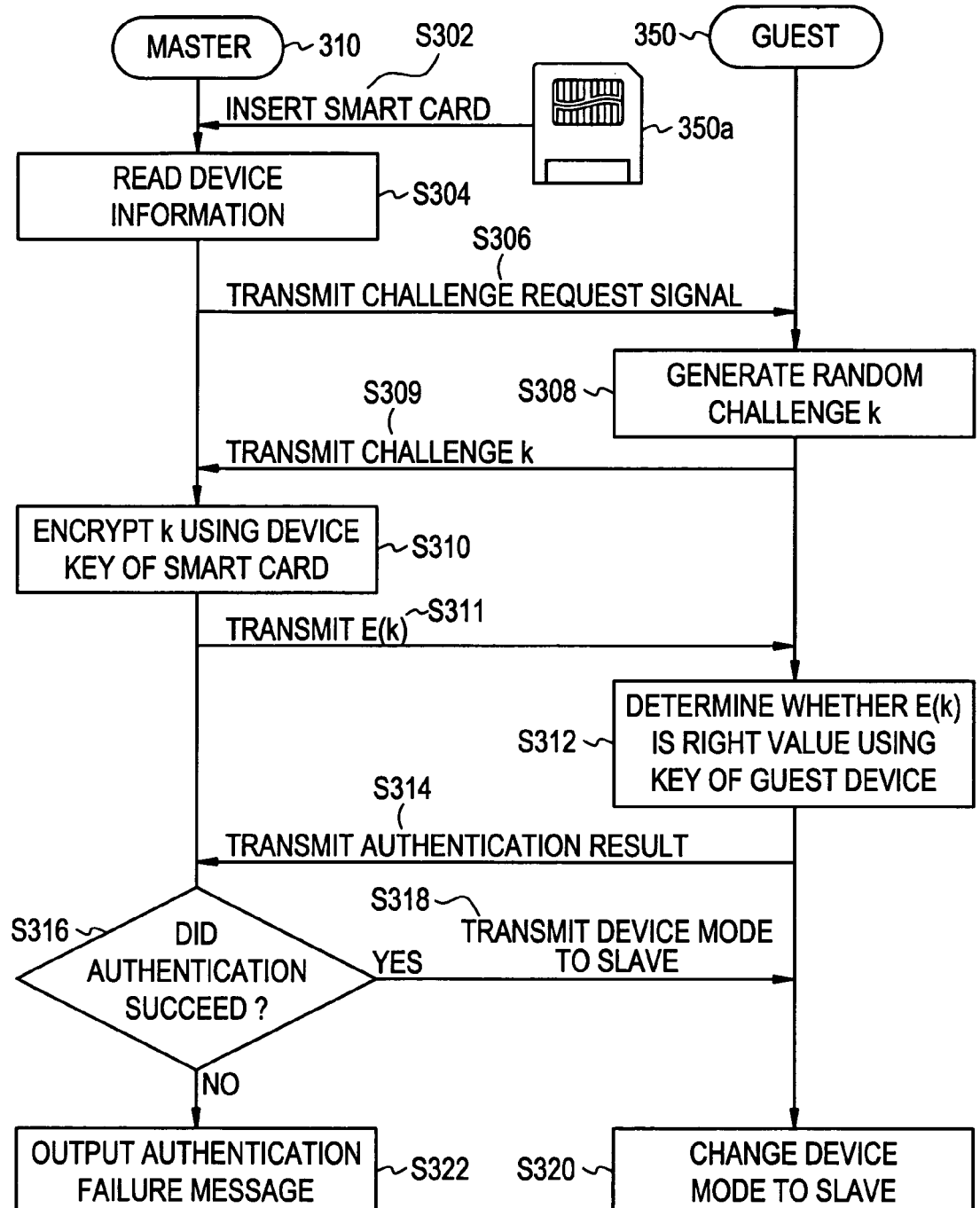
FIG. 4 is a flowchart of a method of building a home domain consistent with an exemplary embodiment of the present invention.

FIG. 4 is a flowchart of a method of allowing a guest device 350 to join a domain as a slave device consistent with an exemplary embodiment of the present invention. At this time, the guest device 350 is status authenticated as a legal device through the authentication process of FIG. 2.

If a user inserts a smart card 350a allocated to the guest device 350 in a smart card reader 310a of a master device 310 or accesses the smart card 350a, which is a contactless RF-IC card, to the smart card reader 310a of the master device 310 in step S302, the smart card reader 310a of the master device 310 reads device information of the guest device 350 stored in the smart card 350a in step S304. At this time, the device information includes a serial number of the guest device 350, a device ID such as a UUID, and a device key used for information encryption.

Figure 5:
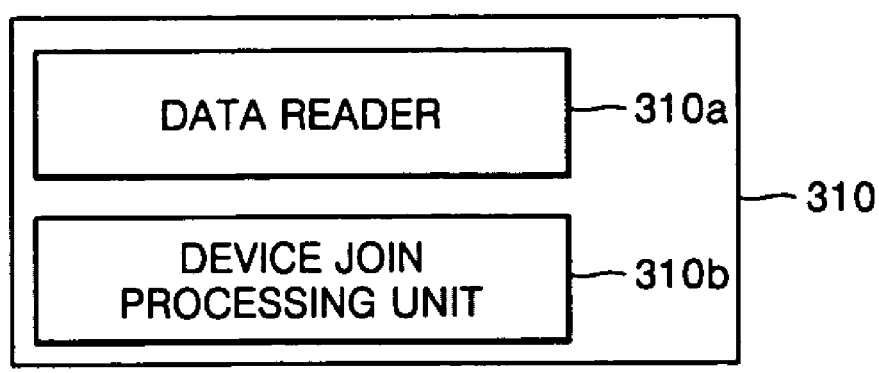
FIG. 5 a block diagram of a master device consistent with an exemplary embodiment of the present invention.

In FIG. 3, the smart card reader 310a is shown as being separated from the master device 310. However, the smart card reader 310a is included as a component of the master device 310 as a data reader 310a as shown in FIG. 5.

In step S306, the master device 310 determines the guest device 350 from the device ID of the device information of the guest device 350 and transmits a challenge request signal to the guest device 350.

In step S308, the guest device 350 receives the challenge request signal from the master device 310, generates a challenge k, which is a random number, and transmits the challenge k to the master device 310 in step S309.

In step S310, the master device 310, which receives the challenge k from the guest device 350, generates E(k) that the challenge k is encrypted with the device key of the guest device 350 read in step S304 using a predetermined encryption algorithm and transmits the E(k) to the guest device 350 in step S311.

In step S312, the guest device 350, which receives the E(k) from the master device 310, generates D(E(k)) that the E(k) is decrypted with a key stored in the guest device 350 using the predetermined encryption algorithm used for encrypting the challenge k in the master device 310 and determines whether the D(E(k)) is the same as the challenge k generated in step S308.

In step S314, if the D(E(k)) and the challenge k are the same, the guest device 350 transmits an authentication success signal to the master device 310, and if the D(E(k)) and the challenge k are not the same, the guest device 350 transmits an authentication failure signal to the master device 310.

In step S316, the master device 310, which receives the authentication result from the guest device 350, determines whether the authentication succeeded or failed. If the authentication succeeded in step S316, the master device 310 transmits a device mode change signal to the guest device 350 in step S318, and the guest device 350 changes its own device mode to the slave mode according to the device mode change signal in step S320. At this time, the master device 310 newly registers the guest device 350 in a slave device list of the master device 310.

On the other hand, if the authentication failed in step S316, the master device 310 outputs an authentication failure message through a user interface screen in step S322, and the user determines that the current master device 310 is an external master device, which is not compatible with the guest device 350.

Figure 6:
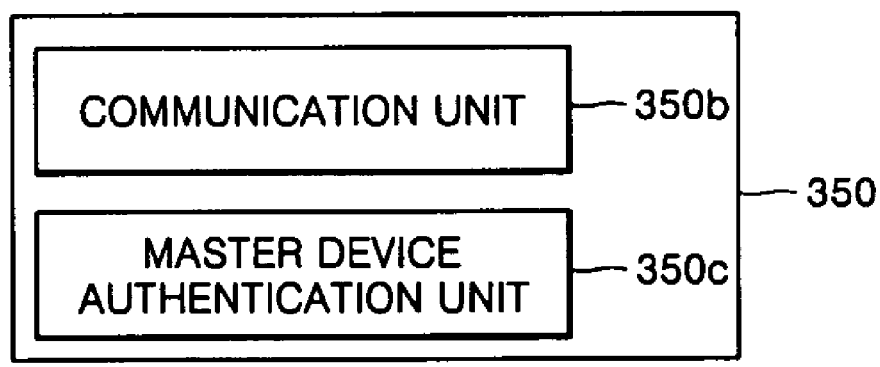
FIG. 6 is a block diagram of a guest device consistent with an exemplary embodiment of the present invention.

In FIGS. 5 and 6, internal configurations of the master device 310 and the guest device 350 are shown, respectively.

The data reader 310a of FIG. 3 is plugged in the master device 310 as a component of the master device 310. A device join processing unit 310b transmits a challenge request signal to the guest device 350 by determining the guest device 350 using the device ID of the guest device 350 read by the data reader 310a in step S306, re-transmits an encrypted challenge value to the guest device 350 by encrypting a challenge k received from the guest device 350 using a predetermined encryption algorithm in step S310, and according to an authentication result of the encrypted challenge value in the guest device 350, joins the guest device 350 in a home domain in step S318, or outputs an authentication failure message in step S322.

A communication unit 350b of the guest device 350 performs communication with the master device 310, such as receiving the challenge request signal from the master device 310 after a smart card 350a of the guest device 350 is read by the master device 310, transmitting the challenge k to the master device 310, receiving the encrypted challenge value from the master device 310, and transmitting an authentication result of the encrypted challenge value to the master device 310.

A master device authentication unit 350c randomly generates the challenge k in response to the challenge request signal from the master device 310 in step S308, decrypts the encrypted challenge value with a decrypting key, which the master device authentication unit 350c has, and authenticates whether the decrypted challenge value is the same as the challenge k generated in step S308 in step S312.

According to the authentication result in the master device authentication unit 350c, the master device 310 joins the guest device 350 in the home domain or outputs the authentication failure message.

The device join processing function of the master device 310 and the master device authentication function of the guest device 350 described above can be written as computer programs and can be implemented in each of the devices that execute the programs using a computer readable recording medium. Examples of the computer readable recording medium include magnetic storage media (e.g., ROM, floppy disks, hard disks, etc.), and optical recording media (e.g., CD-ROMs, or DVDs).

Consistent with an exemplary embodiment of the present invention, a controlled device authenticated as a legal device by a master device joins an authenticated home domain more simply and safely by reading a smart card corresponding to the controlled device in a smart card reader.

Also, since devices intending to join a home domain authenticate a master device of the home domain using a smart card, another external master device is prevented from joining the devices in a home domain at will.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A system for building a home domain, the system comprising:
    a guest device, legality of which is authenticated by a master device in a home domain of the system for building the home domain; and
    a portable data storage medium, which stores device information about the guest device, wherein the device information stored on the portable data storage medium about the guest device, after the legality of the guest device is authenticated by the master device, is read by the master device and used for the master device to join the guest device to the home domain by changing the guest device which is in a guest mode to a slave device in a slave mode of the home domain which uses content of the master device; and wherein the system for building the home domain is in a home network which includes a plurality of slave devices of the home domain and a plurality of guest devices which are not in the home domain, wherein, when the device information is read by the master device, the master device transmits a challenge request signal to the guest device, the guest device generates a challenge value in response to the challenge request signal and transmits the challenge value to the master device, the master device encrypts the challenge value using a predetermined encryption algorithm and transmits the encrypted challenge value to the guest device, the guest device decrypts the encrypted challenge value using the predetermined encryption algorithm and determines whether the decrypted challenge value is the same as the generated challenge value, and when the decrypted challenge value is the same as the generated challenge value, the guest device allows the master device to join the guest device to the home domain, and wherein after authentication of the guest device, the master device transmits a device mode change signal to the guest device and the guest device changes to the slave mode.

2. The system for building the home domain of claim 1, wherein, when the device information is read by the master device, the guest device authenticates whether the master device has a right to join the guest device to the home domain according to a request of the master device.

3. The system for building the home domain of claim 1, wherein the device information about the guest device comprises a device ID, which is used to distinguish the guest device and referred to by the master device to determine the guest device in order to transmit the challenge request signal, and a device key, which is used as an encryption key for encrypting the challenge value.

4. The system for building the home domain of claim 3, wherein, when the predetermined encryption algorithm is a symmetric encryption algorithm, the guest device has a same decryption key as the device key.

5. The system for building the home domain of claim 3, wherein, when the predetermined encryption algorithm is an asymmetric encryption algorithm, the guest device has a secret key making a pair with the device key.

6. The system for building the home domain of claim 1, wherein the portable data storage medium is a smart card.

7. A system for building a home domain, the system comprising:
   a guest device, legality of which is authenticated;
   a portable data storage medium, which stores device information about the guest device; and
   a master device in a predetermined home domain, which, after the legality of the guest device is authenticated by the master device, reads the device information about the guest device and joins the guest device to the home domain based on the read device information and changes the guest device which is in a guest mode to a slave device in a slave mode of the home domain which uses content of the master device; and
   wherein the system for building the home domain is in a home network which includes a plurality of slave devices of the home domain and a plurality of guest devices which are not in the home domain, and
   wherein, when the device information is read by the master device, the master device transmits a challenge request signal to the guest device, the guest device generates a challenge value in response to the challenge request signal and transmits the challenge value to the master device, the master device encrypts the challenge value using a predetermined encryption algorithm and transmits the encrypted challenge value to the guest device, the guest device decrypts the encrypted challenge value using the predetermined encryption algorithm and determines whether the decrypted challenge value is the same as the generated challenge value, and when the decrypted challenge value is the same as the generated challenge value, the guest device allows the master device to join the guest device to the home domain,
   and wherein after authentication of the guest device, the master device transmits a device mode change signal to the guest device and the guest device changes to the slave mode.

8. A home domain building method to join a guest device to a predetermined home domain in a home network including a master device, which forms the home domain, and the guest device, legality of which is authenticated by the master device, the method comprising:
   the master device reading device information from a portable data storage medium storing the device information about the guest device; and
   the master device joining the guest device in the home domain which is in the home network based on the read device information and by changing the guest device which is in a guest mode to a slave device in a slave mode of the home domain which uses content of the master device,
   wherein the system for building the home domain is in the home network which includes a plurality of slave devices of the home domain and a plurality of guest devices which are not in the home domain, and
   wherein joining the guest device in the home domain comprises:
   the master device transmitting a challenge request signal to the guest device;
   the guest device generating a challenge value in response to the challenge request signal and transmitting the challenge value to the master device;
   the master device encrypting the challenge value using a predetermined encryption algorithm and transmitting the encrypted challenge value to the guest device;
   the guest device decrypting the encrypted challenge value using the predetermined encryption algorithm; and
   the guest device determining whether the decrypted challenge value is the same as the generated challenge value, and when the decrypted challenge value is the same as the generated challenge value, allowing the master device to join the guest device in the home domain,
   and wherein after authentication of the guest device, the master device transmits a device mode change signal to the guest device and the guest device changes to the slave mode.

9. A home network member device comprising:
   a communication unit, which, when device information about the home network member device is read by a master device in a home domain from a storage medium having the device information, exchanges predetermined information with the master device based on the read device information; and
   a master device authentication unit, which authenticates whether the master device has a right to join the home network member device in the home domain by exchanging the predetermined information;

wherein the master device joins the home network member device to the home domain by changing the home network member device which is in a guest mode to a slave device in a slave mode of the home domain which uses content of the master device; and wherein the home domain is in a home network which includes a plurality of slave devices of the home domain and a plurality of guest devices which are not in the home domain, and wherein the master device authentication unit generates a challenge value in response to a challenge request signal received from the master device, decrypts the challenge value encrypted by the master device using a predetermined encryption algorithm, determines whether the decrypted challenge value is the same as the generated challenge value, and when the decrypted challenge value is the same as the generated challenge value, allows the master device to join the home network member device in the home domain, and wherein after authentication, the master device transmits a device mode change signal to the home network member device and the home network member device changes to the slave mode.

10. The home network member device of claim 9, wherein the device information comprises a device ID, which is used to distinguish the home network member device and referred to by the master device to determine a guest device in order to transmit the challenge request signal, and a device key, which is used as an encryption key for encrypting the challenge value.

11. The home network member device of claim 10, wherein, when the predetermined encryption algorithm is a symmetric encryption algorithm, the master device authentication unit has a same decryption key as the device key.

12. The home network member device of claim 10, wherein, when the predetermined encryption algorithm is an asymmetric encryption algorithm, the master device authentication unit has a secret key making a pair with the device key.

13. A master device authentication method to allow a home network member device to authenticate a master device in a home domain, the method comprising:

the home network member device, when device information about the home network member device is read by a master device forming a home domain from a storage medium having the device information, exchanging predetermined information with the master device based on the read device information; and the home network member device authenticating whether the master device has a right to join the home network member device in the home domain by exchanging the predetermined information;

wherein the master device joins the home network member device to the home domain by changing the home network member device which is in a guest mode to a slave device in a slave mode of the home domain which uses content of the master device; and wherein the home domain is in a home network which includes a plurality of slave devices of the home domain and a plurality of guest devices which are not in the home domain, and wherein the home network member device authenticating whether the master device has a right to join the home network member device in the home domain by exchanging the predetermined information comprises:

generating a challenge value in response to a challenge request signal received from the master device;

decrypting the challenge value encrypted by the master device using a predetermined encryption algorithm;

determining whether the decrypted challenge value is the same as the generated challenge value; and when the decrypted challenge value is the same as the generated challenge value, allowing the master device to join the home network member device in the home domain, and wherein after authentication, the master device transmits a device mode change signal to the home network member device and the home network member device changes to the slave mode.

14. A non-transitory computer readable medium having recorded thereon a computer readable program for performing a master device authentication method to allow a home network member device to authenticate a master device in a home domain, the method comprising:

the home network member device, when device information about the home network member device is read by a master device forming a home domain from a storage medium having the device information, exchanging predetermined information with the master device based on the read device information; and the home network member device authenticating whether the master device has a right to join the home network member device in the home domain by exchanging the predetermined information;

wherein the master device joins the home network member device to the home domain by changing the home network member device which is in a guest mode to a slave device in a slave mode of the home domain which uses content of the master device; and wherein the home domain is in a home network which includes a plurality of slave devices of the home domain and a plurality of guest devices which are not in the home domain, and wherein the home network member device authenticating whether the master device has a right to join the home network member device in the home domain by exchanging the predetermined information comprises:

generating a challenge value in response to a challenge request signal received from the master device;

decrypting the challenge value encrypted by the master device using a predetermined encryption algorithm;

determining whether the decrypted challenge value is the same as the generated challenge value; and when the decrypted challenge value is the same as the generated challenge value, allowing the master device to join the home network member device in the home domain, and wherein after authentication, the master device transmits a device mode change signal to the home network member device and the home network member device changes to the slave mode.

15. The non-transitory computer readable medium of claim 14, wherein the device information comprises a device ID, which is used to distinguish the home network member device and referred to by the master device to determine the home network member device in order to transmit the challenge request signal, and a device key, which is used as an encryption key for encrypting the challenge value.

16. A non-transitory computer readable medium having recorded thereon a computer readable program for performing a master device authentication method of allowing a home network member device to authenticate a master device in a home domain, the method comprising:

the home network member device, when device information about the home network member device is read by a master device forming a home domain from a storage medium having the device information, receiving a challenge request signal from the master device;

the home network member device generating a challenge value in response to the challenge request signal and transmitting the challenge value to the master device;

the home network member device receiving the challenge value encrypted using a predetermined encryption algorithm by the master device and decrypting the encrypted challenge value using the predetermined encryption algorithm;

the home network member device determining whether the decrypted challenge value is the same as the generated challenge value; and the home network member device, when the decrypted challenge value is the same as the generated challenge value, allowing the master device to join the home network member device in the home domain by changing the home network member device which is in a guest mode to a slave device in a slave mode of the home domain which uses content of the master device; and wherein the home domain is in a home network which includes a plurality of slave devices of the home domain and a plurality of guest devices which are not in the home domain, and, wherein after authentication, the master device transmits a device mode change signal to the home network member device and the home network member device changes to the slave mode.

17. A first home network member device, which joins a second home network member device to a home domain by operating as a master device in the home domain, comprising:

a data reader, which, when the first home network member device operates as a master device, reads device information about the second home network member device from a portable data storage medium of the second home network member device; and a device join processing unit, which joins the second home network member device in the home domain through exchanging predetermined information with the second home network member device based on the read device information; and wherein the master device joins the second home network member device to the home domain by changing the second home network member device which is in a guest mode to a slave device in a slave mode of the home domain which uses content of the master device;

wherein the home domain is in a home network which includes a plurality of slave devices of the home domain and a plurality of guest devices which are not in the home domain, wherein the device join processing unit joins the second home network member device in the home domain in a case where the device join processing unit transmits a challenge request signal to the second home network member device based on the read device information, receives a challenge value generated in response to the challenge request signal by the second home network member device, encrypts the challenge value using a predetermined encryption algorithm, transmits the encrypted challenge value to the second home network member device, and receives an authentication result that the encrypted challenge value is legal from the second home network member device, and wherein after authentication, the master device transmits a device mode change signal to the second home network member device and the second home network member device changes to the slave mode.

18. The home network member device of claim 17, wherein the device join processing unit joins the second home network member device in the home domain in a case where legality of the first home network member device is authenticated by the second home network member device.

19. The home network member device of claim 17, wherein the device join processing unit joins the second home network member device in the home domain in a case where it is determined by the second home network member device that a challenge value decrypted from the encrypted challenge value using the predetermined encryption algorithm is the same as the generated challenge value.

20. The home network member device of claim 17, wherein the device information comprises a device ID, which is used to distinguish the second home network member device and referred to by the first home network member device to determine a second home network member device in order to transmit the challenge request signal, and a first home network member device key, which is used as an encryption key for encrypting the challenge value.

21. A method of allowing a master device, which is a first home network member device, in a home domain to join a second home network member device in the home domain, the method comprising:

the master device reading device information about the second home network member device from a portable data storage medium of the second home network member device; and the master device joining the second home network member device in the home domain through exchanging predetermined information with the second home network member device based on the read device information and by changing the second home network member device which is in a guest mode to a slave device in a slave mode of the home domain which uses content of the master device; and wherein the home domain is in a home network which includes a plurality of slave devices of the home domain and a plurality of guest devices which are not in the home domain, wherein the master device joining the second home network member device to the home domain through exchanging predetermined information with the second home network member device based on the read device information comprises:

transmitting a challenge request signal to the second home network member device based on the read device information;

receiving a challenge value generated in response to the challenge request signal by the second home network member device;

encrypting the challenge value using a predetermined encryption algorithm and transmitting the encrypted challenge value to the second home network member device; and when an authentication result that the encrypted challenge value is legal is received from the second home network member device, joining the second home network member device in the home domain, and wherein after authentication, the master device transmits a device mode change signal to the second home network member device and the second home network member device changes to the slave mode.

22. A non-transitory computer readable medium having recorded thereon a computer readable program for performing a method of allowing a master device, which is a first home network member device, in a home domain to join a second home network member device in the home domain, the method comprising:

the master device reading device information about the second home network member device from a portable data storage medium of the second home network member device; and the master device joining the second home network member device to the home domain through exchanging predetermined information with the second home network member device based on the read device information and by changing the second home network member device which is in a guest mode to a slave device in a slave mode of the home domain which uses content of the master device; and wherein the home domain is in a home network which includes a plurality of slave devices of the home domain and a plurality of guest devices which are not in the home domain, and wherein the master device joining the second home network member device to the home domain through exchanging predetermined information with the second home network member device based on the read device information comprises:

transmitting a challenge request signal to the second home network member device based on the read device information;

receiving a challenge value generated in response to the challenge request signal by the second home network member device;

encrypting the challenge value using a predetermined encryption algorithm and transmitting the encrypted challenge value to the second home network member device; and when an authentication result that the encrypted challenge value is legal is received from the second home network member device, joining the second home network member device in the home domain, and wherein after authentication, the master device transmits a device mode change signal to the second home network member device and the second home network member device changes to the slave mode.

23. The non-transitory computer readable medium of claim 22, wherein the master device joining the second home network member device to the home domain through exchanging predetermined information with the second home network member device based on the read device information comprises joining the second home network member device in the home domain in a case where legality of the master device is authenticated by the second home network member device.

24. A portable data storage medium, which is used for a master device in a predetermined home domain to join a guest device, legality of which is authenticated, in the predetermined home domain, comprising:

a device information storage unit, which stores device information about the guest device, wherein the device information stored in the portable data storage medium is read by the master device and the read device information is used for joining the guest device in the predetermined home domain; and wherein the master device changes the guest device which is in a guest mode to a slave device in a slave mode of the home domain which uses content of the master device wherein the home domain is in a home network which includes a plurality of slave devices of the home domain and a plurality of guest devices which are not in the home domain, wherein, when the device information is read by the master device, the master device transmits a challenge request signal to the guest device, the guest device generates a challenge value in response to the challenge request signal and transmits the challenge value to the master device, the master device encrypts the challenge value using a predetermined encryption algorithm and transmits the encrypted challenge value to the guest device, the guest device decrypts the encrypted challenge value using the predetermined encryption algorithm and determines whether the decrypted challenge value is the same as the generated challenge value, and when the decrypted challenge value is the same as the generated challenge value, the guest device allows the master device to join the guest device to the home domain, and wherein after authentication, the master device transmits a device mode change signal to the home network member device and the home network member device changes to the slave mode.

25. The portable data storage medium of claim 24, wherein the device information comprises a device ID, which is used to distinguish the guest device, and a device key, which is used as an encryption key for encrypting predetermined information when the guest device is joined to the predetermined home domain.

26. The portable data storage medium of claim 24, wherein the portable data storage medium is a smart card.

27. The portable data storage medium of claim 25, wherein the portable data storage medium is a smart card.

28. The system for building the home domain according to claim 1, wherein the portable data storage medium is designated for the guest device.

* * * * *